United States Patent [19]
Bergsneider et al.

[11] Patent Number: 5,717,414
[45] Date of Patent: Feb. 10, 1998

[54] VIDEO IMAGE TRACKING AND MIXING SYSTEM

[75] Inventors: Carl W. Bergsneider, Silver Lake; Clayton W. Castle; Joann A. Pickerine, both of Akron, all of Ohio

[73] Assignee: Lockheed-Martin Tactical Defense Systems, Akron, Ohio

[21] Appl. No.: 431,859

[22] Filed: May 1, 1995

[51] Int. Cl.$^6$ .................................................. G09G 5/00
[52] U.S. Cl. .................................. 345/8; 345/7; 345/158; 359/13; 359/630
[58] Field of Search .................................. 345/7, 8, 156, 345/158; 359/13, 630; 348/734

[56] References Cited

U.S. PATENT DOCUMENTS

| | | |
|---|---|---|
| 4,446,480 | 5/1984 | Breglia et al. ............................ 345/8 |
| 4,649,504 | 3/1987 | Krouglicof et al. ...................... 345/8 |
| 4,866,229 | 9/1989 | Scharfenberg .......................... 345/8 |
| 5,045,843 | 9/1991 | Hansen . |
| 5,130,794 | 7/1992 | Ritchey . |
| 5,138,555 | 8/1992 | Albrecht ................................. 345/8 |
| 5,187,540 | 2/1993 | Morrison . |
| 5,323,174 | 6/1994 | Klapman et al. ....................... 345/156 |
| 5,373,857 | 12/1994 | Travers et al. . |
| 5,394,517 | 2/1995 | Kalawsky . |
| 5,422,653 | 6/1995 | Maguire, Jr. . |
| 5,446,834 | 8/1995 | Deering . |
| 5,457,641 | 10/1995 | Zimmer et al. ......................... 345/8 |
| 5,488,391 | 1/1996 | Favot et al. ............................. 345/156 |
| 5,491,510 | 2/1996 | Gove ....................................... 345/8 |
| 5,502,481 | 3/1996 | Dentinger et al. . |
| 5,515,070 | 5/1996 | Kawada .................................. 345/8 |

*Primary Examiner*—Richard Hjerpe
*Assistant Examiner*—Kent Chang
*Attorney, Agent, or Firm*—Renner, Kenner, Greive, Bobak, Taylor & Weber

[57] ABSTRACT

A video image tracking system is provided for determining the orientation of an operator with respect to a simulator display. The operator carries an observation device for watching the simulator display which has a detectable object disposed therein. The video image tracking system further includes a device for locating the detectable object within the simulator display and communicates this location to a virtual reality system which displays the proper orientation and location of the virtual environment with respect to the operator. The video image tracking system is incorporated into a virtual environment deployable simulator which has an environment system for including virtual reality effects into a plurality of color keys contained within the simulator display.

13 Claims, 4 Drawing Sheets

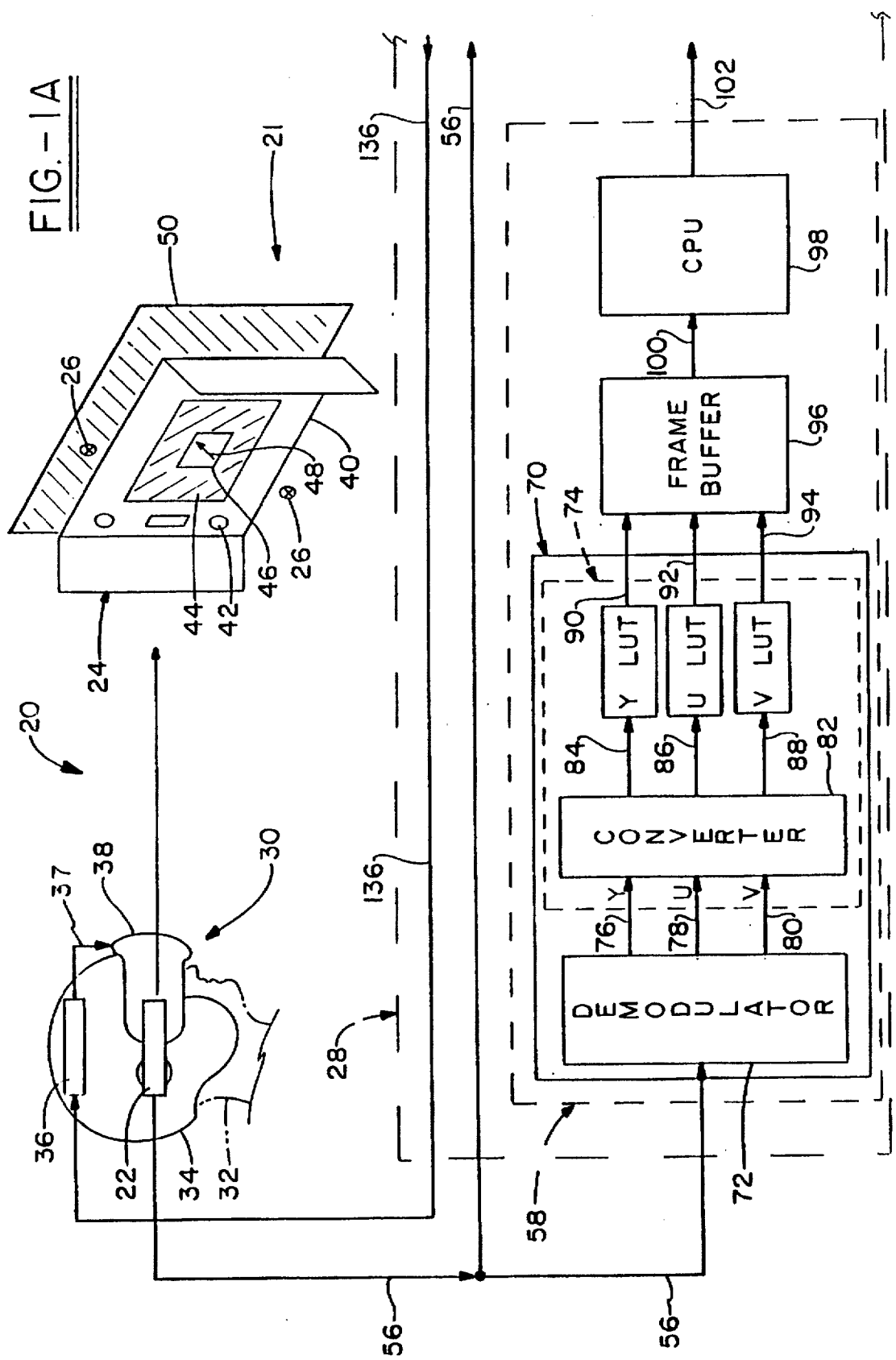

VIDEO IMAGE TRACKING AND MIXING SYSTEM

TECHNICAL FIELD

The invention herein resides generally in the art of tracking devices for virtual reality and augmented reality systems. More particularly, the present invention relates to a tracking device which employs a detectable object as a reference point within the virtual reality or augmented reality scene. Specifically, the present invention relates to a tracking device that uses a preselected color range within a virtual reality or augmented reality system to coordinate the positional location of an operator and wherein the device is used in conjunction with a virtual environment deployable simulator.

BACKGROUND ART

Currently, there are many known uses of virtual reality and augmented reality systems, hereinafter referred to as virtual reality systems. The most popular use of virtual reality systems is for entertainment in such things as video games and amusement rides. It is also known to use virtual reality systems in industrial applications for the purpose of training technicians to direct robots so that the technician is not exposed to a dangerous environment. A common industrial use for virtual reality systems is in the field of aircraft flight simulators. Flight simulators allow pilot trainees and/or experienced pilots to rehearse flight plans and become more acquainted with a particular aircraft. Flight simulators also have the added benefit of saving the cost of using an actual aircraft.

In order for a virtual reality system to appear lifelike it is required that the positional location of the person using the virtual reality system be accurately calculated. Devices for this purpose include but are not limited to head tracking sensors and wired gloves. These positional sensors allow the virtual reality system to monitor an object's position and orientation at any given time. Of course, these monitoring devices function in real time so that the operator's actions are synchronized with that of the virtual reality scene. In order for a virtual reality system to function properly, the lag or the delay between sensor movement and the resulting signal being processed by the virtual reality system must be minimized.

Another important factor for a positional and orientation sensor is that it recognize changes in operator motion as quickly as possible so that the objects within the virtual reality scene do not appear to drift. It is commonly known that position sensors or trackers work by measuring changes in position relative to some reference point or condition. For example, active tracking sensors are attached to the moving object and generate a corresponding signal to a processing unit. Passive tracking sensors employ several cameras to watch the moving object so as to determine its position and orientation.

Examples of active tracking systems include the use of electromagnetic sensors, ultrasonic sensors, and mechanical systems. Electromagnetic systems are the most popular because of their small size and freedom of movement. Electromagnetic tracking devices operate by creating at least three independent magnetic fields which correspond to the position and orientation of the object being tracked which is typically the operator. A similar set of electromagnetic devices are positioned within range of the tracked object so as to provide a corresponding positional signal. Although electromagnetic sensors are effective, they have been found to have lengthy lag times due to the signal processing required. Additionally, electromagnetic sensors are susceptible to magnetic fields generated by other electrical equipment. Another approach for tracking an object is to use three ultrasonic sensors and three small microphones. Each ultrasonic transducer emits a high frequency sound that is picked up by all three of the microphones. Based on the time delay between each transducer and set of microphones a positional or orientation location is determined. Drawbacks of using an ultrasonic system include the fact that they must be positioned so that the ultrasonic transducer is not obstructed by anything between it and the microphone. Furthermore, ultrasonic sensors are subject to other noise interference within a virtual reality system. It is also possible to mechanically track the object movement by attaching mechanical linkage between a reference point and the object being tracked. Unfortunately, this system does not provide a great range of motion for the operator.

Based upon the foregoing, it is evident that there is a need for a video image tracking system which provides a simple yet effective method of tracking an object's position and orientation within a virtual reality environment. Furthermore, there is a need for a video image tracking system that employs existing hardware and is not susceptible to electrical or audio interference. There is also a need for a video image tracking system that can be employed in a virtual environment deployable simulator which is easily moved between locations.

DISCLOSURE OF THE INVENTION

In light of the foregoing, it is a first aspect of the present invention to provide a video image tracking system.

Another aspect of the present invention is to provide a video image tracking system for a virtual reality or augmented reality system.

An additional aspect of the present invention is to provide a video image tracking system wherein a tracked device, such as a detectable object or color tracking dot, is located within a virtual reality scene.

A further aspect of the present invention is to provide a virtual environment deployable simulator which allows a virtual reality flight simulator to be incorporated into a cockpit of an airplane.

Yet an additional aspect of the present invention is to provide a video image tracking system which utilizes a predetermined color in a virtual reality scene as the detectable object so that the motion of the tracking device, which is typically a camera carried by an operator, can be easily determined.

A further aspect of the present invention is to provide a video image mixing system that allows for the insertion of a plurality of animated instruments within the virtual reality scene.

Another aspect of the present invention is to provide a video image tracking system wherein a tracked device, such as a detectable object or color tracking dot, is contained within a flight simulator display scene.

Still a further aspect of the present invention is to provide a video image tracking system wherein the tracked device, such as a detectable object or color tracking dot, is deployed in a modified cockpit of an airplane.

Yet a further aspect of the present invention is to provide a video image tracking system which allows incorporation of out-the-window visual scenes within the virtual reality scene.

Still a further aspect of the present invention is to provide a video image tracking system that demodulates colors contained within the virtual reality scene into components of lightness, hue, and saturation for comparison to predetermined ranges so that a search algorithm can ascertain the position and orientation of an operator.

Yet another aspect of the present invention is to provide a video image tracking system wherein a locating system is employed to triangulate the position of the operator.

The foregoing and other aspects of the invention which shall become apparent as the detailed description proceeds, are achieved by a video image tracking system for determining the orientation of an operator with respect to a simulator display, comprising: an observation device carried by an operator; a simulator display watched by the observation device, the simulator display having a detectable object; a device for locating the detectable object in communication with the observation device, wherein the locating device determines the position of the operator in relation to the detectable object; and a device for displaying the observed position of the operator in relation to the simulator display.

The present invention also provides a virtual environment deployable simulator, comprising: an observation device carried by an operator; a simulator display watched by the observation device, the simulator display having a plurality of independent color keys; a device for tracking the observation device in relation to the simulator display, the tracking device generating a locator signal; an environment system for receiving the locator signal and incorporating virtual effects into the plurality of color keys; and a device for displaying the virtual effects within the simulator display.

DESCRIPTION OF DRAWINGS

FIGS. 1A-B show a schematic diagram illustrating the operation of a video image tracking system within a virtual environment deployable simulator;

BEST MODE FOR CARRYING OUT THE INVENTION

Figure 1B:
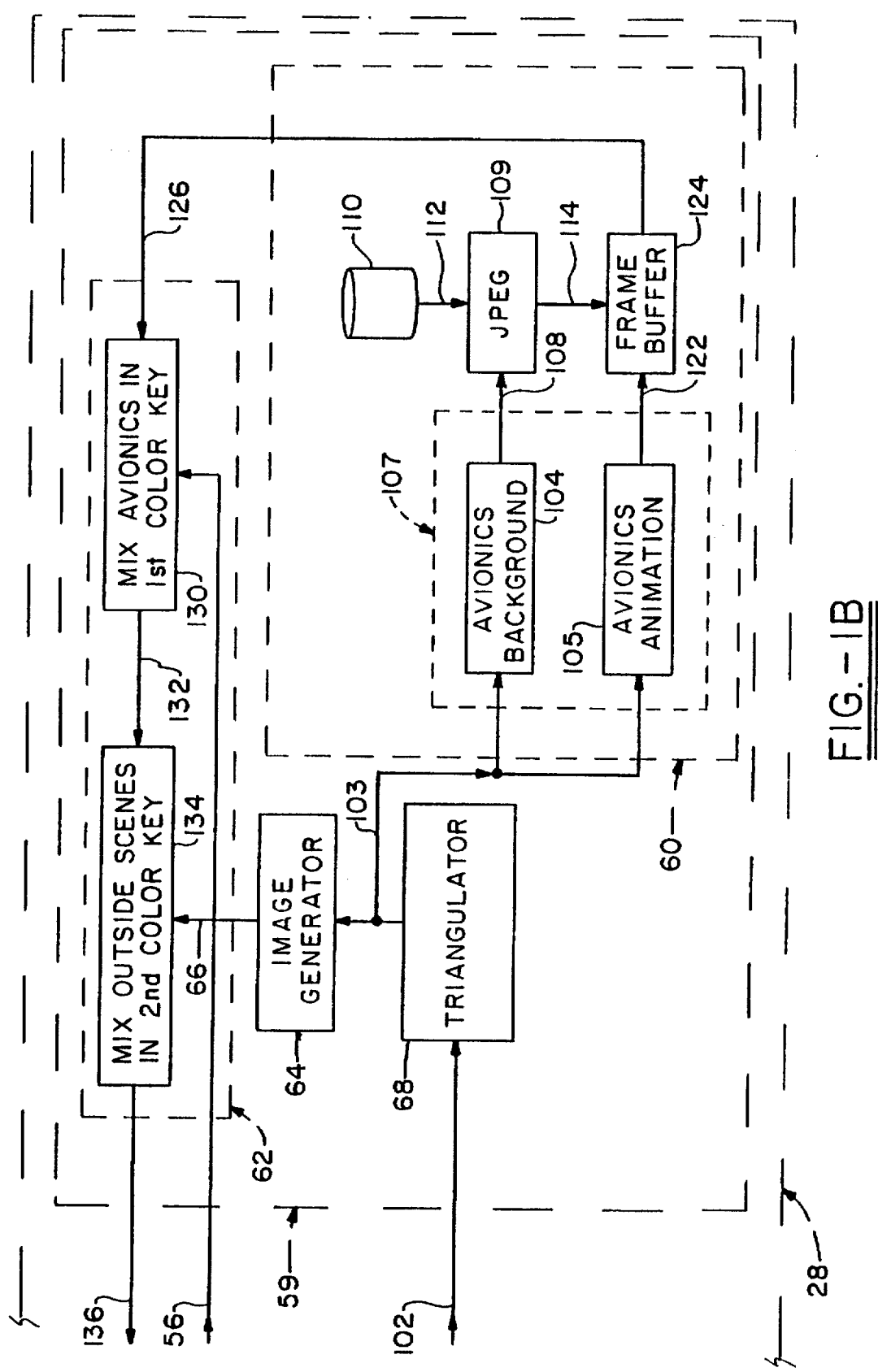

Referring now to the drawings and more particularly to FIGS. 1A and 1B, it can be seen that a video image tracking system according to the present invention is designated generally by the numeral 20. Generally, the video image tracking system 20 includes an observation or tracking device 22, such as a camera, which observes a simulator display 24 that has a detectable object or track color 26, a locating system 28 and a helmet mounted display system 30. As will be described in detail below, an operator of the video image tracking system 20 carries the camera 22 for watching the simulator display 24 in such a manner that the detectable object or track color 26 provides a point of reference received by the locating system 28. The locating system 28 generates a signal that is received by the helmet mounted display system 30 which provides a virtual environment for the operator to observe. Although the drawings are exemplary of a video image tracking system 20 in a flight simulator, it will be appreciated that the present invention could also be practiced with any other type of virtual reality or augmented reality system. Furthermore, it will also be appreciated that the video image tracking system 20 is employed in a virtual environment deployable simulator 21 which allows a virtual environment to be easily transported from one location to another.

In particular, the video image tracking system 20 has an observation device camera 22 which is carried by an operator 32. Typically, the camera 22 is carried by or mounted on the operator 32 so that it observes the simulator display 24. Those skilled in the art will appreciate that the simulator display 24 could also be the actual cockpit of an airplane or the control panel of any type device. The simulator display 24 includes a detectable object or track color 26 strategically placed therein. The camera 22 is communicative with a locating system 28 which monitors the orientation and position of the camera 22 with respect to the simulator display 24 for display by the virtual reality system 30.

The helmet mounted display system 30 is carried by or mounted on the operator 32. The helmet mounted display system 30 includes a helmet 34 which has a virtual reality projector 36 for transmitting a virtual reality image 37 that is received by a virtual reality screen 38. As is well known in the art, the virtual reality screen 38 is usually in the form of a pair of goggles that are strategically placed in the line of sight of the operator 32. It will also be appreciated that the helmet 34 has the camera 22 carried or mounted on either side or on both sides of the helmet 34. It will further be appreciated that the helmet mounted display system 30 does not interfere with the line of sight of the camera 22 for observing the simulator display 24.

The simulator display 24 includes an instrument panel 40. The instrument panel 40 includes actual avionic instruments 42 and a first color key 44 in which the locating system 28 incorporates virtual avionic instruments or background 46. Superimposed on the virtual avionic instrument parts 46 are animated avionic instrument panel 48, such as moving needles, dials and the like. A second color key 50 is also included in the instrument panel 40. As is well known in the fields of broadcasting and virtual reality, an independent predetermined color is used for each of the color keys 44 and 50. As will be explained later, the locating system 28 incorporates the virtual avionic instruments and out-the-window visuals in the predetermined color keys 44 and 50, respectively.

The locating system 28 receives a camera signal 56 generated by the camera 22. Included in the locating system 28 are a visual tracker 58 and an environment system 59. Generally, the visual tracker 58 receives and demodulates the camera signal 56 to determine the location and orientation of the operator 32 with respect to the simulator display 24. Generally, the environment system 59 receives a locator signal generated by the visual tracker 58 and determines the orientation of the virtual avionics, which are mixed with the camera signal 56 based on the track color 26, and correspondingly generates a virtual reality signal received by the virtual reality system 30. The environment system 59 includes a virtual avionic system 60, a mixer system 62, a virtual image generator 64 which generates an image signal 66 received by the mixer system 62, and a triangulator 68 which is part of an alternative embodiment to be discussed later.

The visual tracker 58 includes a digitizer 70 which receives the camera signal 56, a frame buffer 96 and a central processing unit (CPU) 98 for determining the location of the track color 26 with respect to the operator 32. In particular, the visual tracker 58 has a digitizer 70 which includes a demodulator 72 and a comparator 74. The demodulator 72 functions to receive the camera signal 56, which is a low resolution video signal and further breaks the signal into its proper color components. As such, the demodulator 72 generates a Y signal 76 which represents the lightness component, a U signal 78 which represents one hue/saturation color component, and a V signal 80 which represents the other hue/saturation color component. The Y, U, and V signals 76, 78, and 80 respectively, are received by a comparator 74 which includes a converter 82 that is communicative with a look-up table 84, a look-up table 86 and a look-up table 88. In the preferred embodiment, the demodulator 72 is available from Phillips Semiconductors as Part No. SAA7191 and the comparator 74 is also available from Phillips Semiconductors as Part No. SAA7192A. Those skilled in the art will appreciate that for purposes of this invention the converter 82, which normally converts a Y, U, V signal to an RGB signal, is placed in the off position. As such, the look-up tables 84, 86 and 88 respectively receive the Y, U, V signals 76, 78 and 80. Therefore, the look-up tables 84-88 determine whether the colors contained within the camera signal 56 are within a predetermined range of values such that the track color 26 can be located within the simulator display 24. Accordingly, the look-up tables 84, 86 and 88, respectively generate a Y bi-level signal 90, a U bi-level signal 92 and a V bi-level signal 94, all of which are received for storage by a frame buffer 96. Those skilled in the art will appreciate that a CPU 98 provides a search algorithm 100 that determines the location and orientation of the track color 26 within the simulator display 24 by examining the frame buffer 96. The CPU 98 then generates a locator signal 102 for use by the environment system 59.

The environment system 59 receives the locator signal 102 at triangulator 68. The triangulator 68 receives the locator signal 102 to determine the operator's position and orientation. In an alternative embodiment there may be multiple cameras 22 and visual trackers 58 whose signals are combined by the triangulator 68. The triangulator 68 generates an operator position 103 that it is received by the virtual avionics system 60 and in particular by an avionics background program 104 and an avionics animation program 105. The operator position 103 is also received by the image generator 64. The avionics background program 104 running inside a CPU 107 generates a background signal 108 which functions to orient the positional location of the avionic instrument parts 46 with respect to the operator position 103. The background signal 108 is received by a decompression device 109 which is commonly referred to as a JPEG device. The decompression device 109 also receives pre-stored images from a database 110 by a signal line 112. As such, the pre-stored images from the database 110 generate a translated and rotated background image 114 which is stored in frame buffer 124.

In a similar fashion, the operator position 103 is also received by the avionics animation program 105 running inside the CPU 107. Those skilled in the art will appreciate that the avionics animation program 105 generates a moving avionics image 122 of the moving components of the animated virtual avionic instrument parts 48 which is received by the frame buffer 124. The frame buffer 124 receives both the background image 114 and moving avionics image 122 to generate a virtual avionics signal 126. The virtual avionics signal 126 combines and provides the animated avionic instrument parts 48 and the virtual avionic instrument parts 46 to the mixer system 62.

The mixer system 62 receives the virtual avionics signal 126 and combines it with the camera signal 56. In particular, an avionics mixer 130 receives both the camera signal 56 and the virtual avionics signal 126 for the purpose of mixing the virtual avionic instrument parts 46 and the animated virtual avionic instrument parts 48 into the first color key 44. The avionics mixer 130 then generates a mixed avionics signal 132 which is received by an outdoor mixer 134. The outdoor mixer 134 receives an image signal 66 which is generated by the image generator 64. Those skilled in the art will appreciate that the image signal 66 could be any out-the-window visual or any other desired scene that supplements the virtual reality scene. The outdoor mixer 134 mixes the image signal 66 into the second color key 50 so as to generate a virtual reality signal 136 which is received by the virtual reality projector 36 for display on the virtual reality screen 38.

Figure 2:
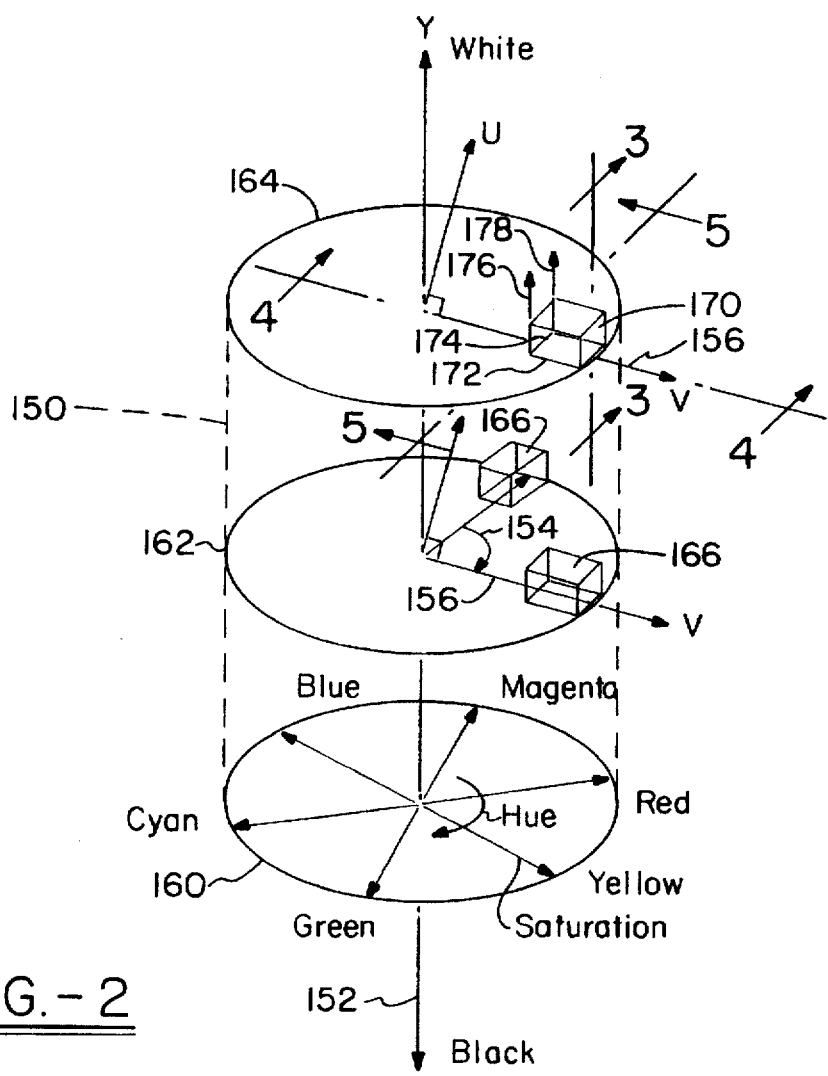
FIG. 2 is a perspective view of a "color solid" illustrating the determination of whether a color within the virtual environment deployable simulator is to be used as a tracking color within the video image tracking system.

For a complete understanding of how the visual tracker 58 functions, reference is now made to FIG. 2. Those skilled in the art will appreciate that FIG. 2 represents a color solid which pictorially represents the various components of color that are defined by hue, saturation and lightness. In particular, the color solid is generally represented by the numeral 150 and is three dimensional in nature. The lightness component of the color solid 150 is represented by the Y axis 152. The Y axis 152 represents the range of lightness from black to white. In other words, at one extreme of the Y axis 152 is the color black, which reflects no light, and at the other extreme of the Y axis 152 is the color white which reflects all light, there being various shades of gray disposed therebetween. The hue and saturation components of the color solid 150 are indirectly represented by a U axis 154 and V axis 156. In a polar coordinate system, the hue is the angle from the center point of the U-V plane, and the saturation is the distance from the center. This same color space, defined in a rectangular or cartesian coordinate system, is defined by U axis 154 and V axis 156. The hue is the color variable to which names such as red, blue, and yellow are assigned. The saturation of the color solid 150 represents the deepness or richness of the color solid 150.

The color solid 150 is best understood by reference to a color circle 160 wherein it can be seen that different colors are represented. It will be appreciated that as values of lightness, hue and saturation are varied, the color varies accordingly. Referring now to a color circle 162 and the color circle 160, it can be seen that as a color range 166 moves from one position on the V axis to another, the hue of the color changes accordingly. In other words, as the V axis 156 rotates, the hue of the color changes from red to yellow. This is done to align the color range 166 to one of the axes (the V axis 156 in this case), so the hue and saturation inside the relatively narrow color range are roughly equivalent to U and V. FIG. 2 also provides a third color circle 164, the importance of which is explained in the operation of the invention.

Referring back to FIGS. 1A and 1B, the operation of the device will be explained. The operator 32 carries on his or her head a helmet mounted display system 30. Also carried on the helmet mounted display 30 is an observation device or camera 22 which has an unobstructed view of the simulator display 24. The camera 22, which observes and watches the simulator display 24, generates a camera signal 56 received by the visual tracker 58. The camera signal 56 is a low resolution video signal. The simulator display 24 is made up of an instrument panel 40, which has a first color key 44 and a second color key 50 disposed thereon. Also disposed on the instrument panel 40 are the actual instruments 42 which are connected either to a computer generated source, to an actual aircraft, or a control device. Those skilled in the art will appreciate that the first color key 44 and the second color key 50 are distinguishable from each other and from any other color contained within the simulator display 24. As such, specific virtual avionics instruments/ background 46 can be substituted in the place of the first color key 44 and specific out-the-window visuals can be incorporated into the second color key 50. Also disposed in the simulator display 24 is a detectable object or track color 26. The track color 26 is distinguishable from the color keys 44 and 50 and all other colors contained within the simulator display 24. It will be appreciated that the track color 26 is in a known and fixed position with relationship to the other actual avionics 42 and the color keys 44 and 50.

The visual tracker 58 receives and demodulates the camera signal 56, determines the location of the track color 26 and generates a locator signal 102. In particular, the demodulator 72 observes all colors within the simulator display 24 to find the location of the track color 26. As best seen in FIG. 2, the track color 26 is represented by the actual color range 166 in the second color circle 162. In order to facilitate detection of the tracking color 26, the demodulator 72 rotates the U axis 154 so that all colors within the simulator display 24 are aligned on a predetermined V axis 156. As such, the rotation by the demodulator 72 rotates the actual color range 166 to a modified color range 170 shown in color circle 164. Afterwards, the demodulator 72 segments the camera signal 56 into a Y, U, and V signal, 76, 78 and 80, respectively. Each of these signals 76, 78 and 80 represents the components of the color solid 150 discussed above and each are separately received by the respective look-up tables 84–88.

Figure 3:
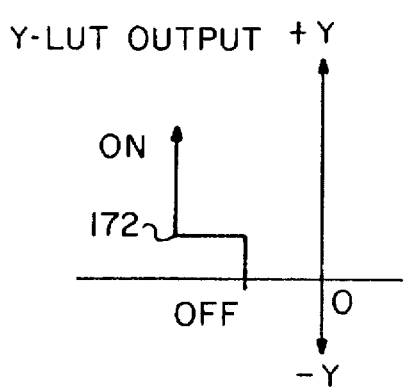
FIG. 3 is a graphical representation of FIG. 2 taken along line 3—3 of the lightness (Y) component of the preselected tracking color within the video image tracking system.
Figure 4:
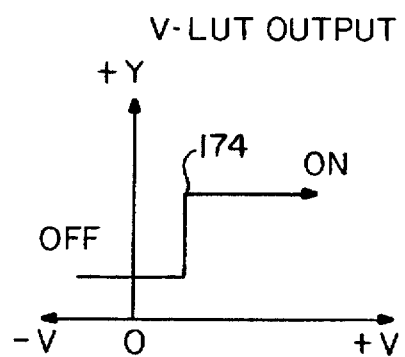
FIG. 4 is a graphical representation of FIG. 2 taken along line 4—4 of the V-hue/saturation component of the preselected tracking color within the video image tracking system.
Figure 5:
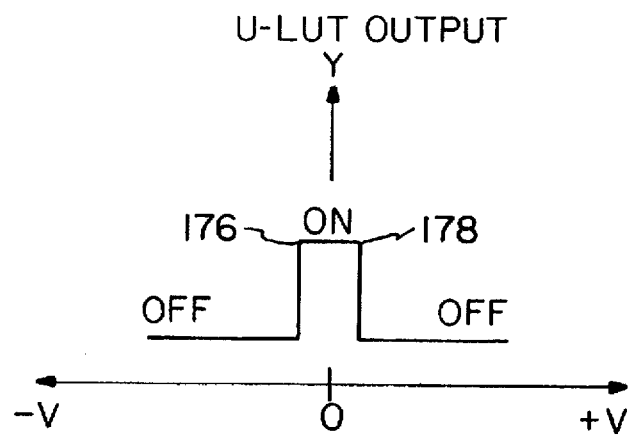
FIG. 5 is a graphical representation of FIG. 2 taken along line 5—5 of the U hue/saturation component of the preselected tracking color within the video image tracking system.

Referring now to FIGS. 1A, 1B and 2, the look-up tables 84, 86 and 88 function to see if the observed colors from the camera signal 56 fall within the predetermined range of values for the modified color range 170 which is equivalent to the track color 26. As seen in the color circle 164 of FIG. 2, the modified color range 170 has borders defined along the Y axis 152, the U axis 154, and the V axis 156. FIGS. 2 and 3 show that the modified color range 170 is defined at the Y axis 152 by a border 172. Therefore, if a particular color in camera signal 56 is greater than or equal to the value defined by border 172, the look-up table 84 generates a Y bi-level signal 90 with an "on" value, otherwise an "off" value is generated. FIG. 4 shows that the modified color range 170 is defined at the V axis 156 by a border 174. As such, if a particular color in camera signal 56 is greater than or equal to the value defined by border 174, the look-up table 88 generates a V bi-level signal 94 with an "on" value, otherwise an "off" value is generated. FIG. 5 shows that the modified color range 170 is defined along the U axis 154 by borders 176 and 178. Therefore, if a particular color in camera signal 56 is greater than or equal than the value defined by border 176 and less than or equal to the value defined by border 178, the look-up table 86 generates a U bi-level signal 92 with an "on" value, otherwise and "off" value is generated.

Those skilled in the art will appreciate that in order for the track color 26 to be positively identified, all of the bi-level signals 90, 92, and 94 must be toggled to the "on" position. In other words, all three components (lightness, hue and saturation) of any color within the simulator display 24 must be identifiable within the modified color range 170 for classification as the track color 26. It will be understood that by rotating the actual color range 166 to the modified color range 170, the ability to detect the track color 26 is greatly enhanced. Although any color range within the color solid 150 could be employed as a track color 26, the modified color range 170 is selected to be at an extreme position in the color solid for easier detection thereof. The borders 172 and 174 are selected so that any value greater than or equal thereto provides an "on" bi-level signal 90 and 94, respectively. The borders 176 and 178 are selected so as to be aligned with the V axis, such that any value therebetween generates an "on" bi-level signal 92.

The frame buffer 96 receives the bi-level signals 90 through 94. If all of the bi-level signals 90–94 indicate that the color range 170 is in fact the track color 26, the CPU 98 implements a search algorithm 100 to determine the exact location and orientation of the track color 26 within the simulator display 24.

Figure 6:
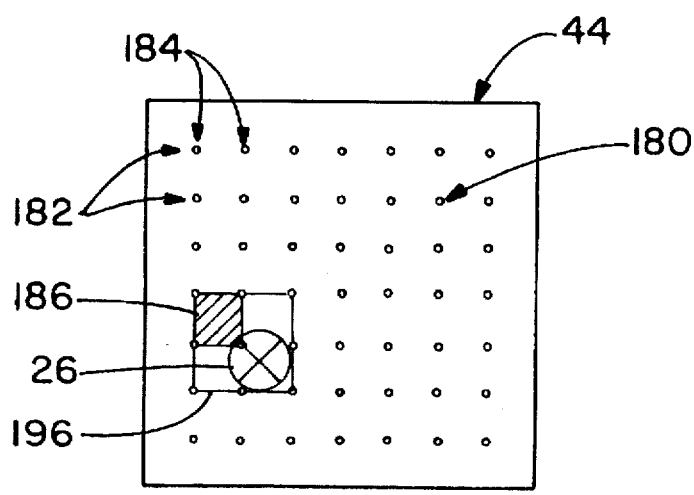
FIG. 6 illustrates a tracking color superimposed over a course search dot.
Figure 7:
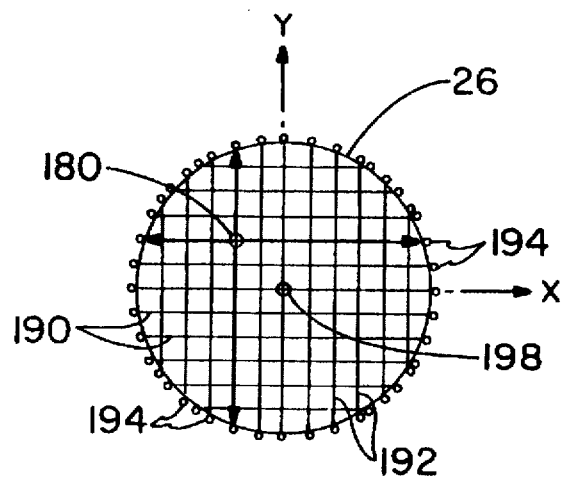
FIG. 7 illustrates a tracking color and components thereof in a fine search.

The search algorithm 100 is best understood by referring to FIGS. 6 and 7. In FIG. 6 it can be seen that the first color key 44 has superimposed thereon a matrix of course search dots 180. The matrix of course search dots 180 has a plurality of course rows 182 and a plurality of course columns 184. A course block 186 is defined by the area where two adjacent course rows 182 intersect two adjacent course columns 184. As seen in FIG. 6, the tracking color 26 is large enough so that it covers at least one course search dot 180 within the matrix of course search dots. The search algorithm 100 in CPU 98 first searches each course row 182 for a course search dot 180 that is covered by the track color 26. The search algorithm then searches each course column 184 to confirm that the selected course search dot 180 is covered by the track color 26.

Referring now to FIG. 7, it can be seen that the track color 26 is further segmented into a plurality of fine search rows 190 and a plurality of fine search columns 192. The fine search rows 190 are parallel to the course search rows 182 and the fine search columns 192 are parallel to the course search columns 184. The search algorithm then conducts a fine search by determining the location of a plurality of fine points 194 that surround the track color 26. The fine points 194 are determined by all the points where the fine search rows 190 and fine search columns 192 intersect with the perimeter of the track color 26. The search algorithm 100 takes the positional location of each fine point 194 to derive a set of course block statistics. Those skilled in the art will appreciate that the course block statistics provide the exact position and orientation of the track color 26 within the simulator display 24.

To further verify the location of the track color 26, a huge block 196 shown in FIG. 6, which comprises the four course block 186 adjacent to the course search dot 180 that is covered by the track color 26, provides additional data for the course block statistics. This data includes but is not limited to the center point, the height and width of the track color 26 and its skew in relation to the simulator display 24. Those skilled in the art will appreciate that the search algorithm 100 is focused to that area around the track color 26 in relation to the location of the camera 22 with respect to the simulator display 24. After the search algorithm 100 has positively located the track color 26 within the simulator display 24, the CPU 100 incorporates this information and generates a locator signal 102.

Referring back to FIG. 1, environment system 59 receives the locator signal 102 at the triangulator 68 which provides the operator position 103 to the virtual avionics system 60 and in particular to the CPU 107. In fact, the operator position 103 is split and received by both the avionics background program 104 and the avionics animation program 105. The avionics background program 104 generates a background 108 that orients the virtual avionic instruments 46 with respect to the position of the operator 32 in the simulator display 24. In a similar fashion, the avionics animation program 105 properly orients the animated virtual avionic components 48, such as the needles and other movable parts, contained within the avionic instruments 46 to generate the position signal 122.

The decompression device 109 receives the background signal 108 and combines therewith the presorted images contained within the database 110 so as to generate a translated and rotated background image 114. Those skilled in the art will appreciate that the pre-stored images contained within the database 110 reduce processing time for the overall virtual environment deployable simulator 21. The frame buffer 124 combines both the translated and rotated background image 114 and the position signal 122 so as to generate the virtual avionics signal 126.

Mixer system 62 receives the virtual avionics signal 126, the camera signal 56 and the image signal 55, for the purpose of mixing and properly locating the virtual avionics, the virtual animated avionics and the out-the-window scenes into the simulator display 24. In particular, the avionics mixer 130 receives the virtual avionics signal 126 and the camera signal 56 so that the virtual avionic instruments and background 46 and the animated virtual avionics 48 are mixed and superimposed over the color key 44. The avionics mixer 130 then generates a mixed avionics signal 132. The outdoor mixer 134 receives the mixed avionics signal 132 and the image signal 66 generated by the image generator 64. The image signal 66 contains out-the-window visual scenes which are superimposed over the color key 50 of the simulator display 24. The outdoor mixer 134 generates a virtual reality signal 136 which includes all the required avionics instrument scenes and out-the-window scenes for display in the virtual reality system 30. The virtual reality signal 136 provides a signal wherein the movements of the operator 32 are combined and coordinated with the actual avionics 42, the virtual avionics instruments 46, the animated virtual avionics 48 incorporated into the virtual avionics 46, and the out-the-window visual scenes provided by the image generator 64.

The virtual reality system 30 receives the virtual reality signal 136 at the virtual reality project 36. The virtual reality project 36 then transmits the virtual reality image 37 onto a virtual reality screen 38, which is typically a pair of virtual reality goggles attached to the helmet 34.

It is apparent then from the above description of the operation of the video image tracking system 20 that the problems associated with previous tracking systems have been overcome. In particular, the video image tracking system 20 does not require the attachment of any special hardware or sensors to the operator 32 (beyond the camera that is already part of the system) as do the other known tracking devices. The benefit of the current video image tracking 20 is that it only requires a track color or detectable object 26 within the simulator display 24 and a search algorithm to properly locate the track color 26, and the color keys 44 and 50 such that they are independently distinguishable from one another and any other color within the simulator display 24. Furthermore, by employing the video image tracking system 20 in the virtual environment deployable simulator 21, the overall lag and system delay is minimal thus providing a more responsive and realistic virtual reality system. By determining the camera orientation and location with respect to the track color 26, the video image tracking system 20 provides a superior method of tracking the position of the operator 32 within a virtual reality environment.

A further advantage of the above-described virtual environment deployable simulator 21, which employs the video image tracking system 20, is that any type of existing cockpit or control panel environment can be easily modified to create a virtual environment system. For example, an operator 32 can use the virtual reality system 30 while the appropriate color keys 44 and 50 are superimposed over the desired instruments where virtual avionics and environments are desired. As such, the window of a cockpit can be covered with the color key 50 and the desired instruments can be covered with the color key 44. The remaining instruments within the simulator display 24 can then be employed as they normally would in an actual situation. This allows the operator to rehearse flight plans or for the evaluation of operators in the testing of their capabilities in emergency situations.

In an alternative embodiment it will be appreciated that the image generator 64 is in communication with a triangulator 68 wherein two cameras 22 are carried on the sides of helmet 34. As such, additional information regarding the position of the operator 32 with respect to the simulator display 24 can be derived. With the distance between the two cameras 22 known, a more precise determination of X, Y, Z, roll, yaw and pitch of the operator movement with respect to the simulator display 24 is easily ascertained and can be incorporated into the image signal 66 through the image generator 64.

Thus, it can be seen that the objects of the invention have been satisfied by the structure presented above. It should be apparent to those skilled in the art that the objects of the invention could be practiced with any type of cockpit or flight simulator or any type of control panel environment.

While the preferred embodiment of the invention has been presented and described in detail, it will be understood that the invention is not limited thereto or thereby. As such, various types of color keys, instrumentation displays and out-the-window visual displays may be used in the operation of the invention to meet the various needs of the end user. Accordingly for an appreciation of the true scope and breadth of the invention, reference should be made to the following claims.

What is claimed is:

1. A video image tracking system for determining the orientation of an operator with respect to a simulator display, comprising:

an observation device carried by an operator;

a simulator display watched by said observation device, said simulator display having a visibly detectable track color that is distinguishable from all other colors in said simulator display and an instrument panel which has disposed thereon a first color key and a second color key, wherein said first color key and said second color key are watched by said observation device;

means for locating said visibly detectable track color in communication with the observation device, wherein said locating means determines the position of said operator in relation to said visibly detectable track color, said locating means comprising means for tracking said visibly detectable track color, wherein said tracking means receives an observation signal generated by said observation device, demodulates said observation signal, determines the location of said visibly detectable track color, and generates a locator signal;

an environment system for receiving said locator signal so as to determine the orientation of a plurality of virtual avionics in relation to said visibly detectable track color and for generating a virtual avionics signal; and a mixer system for receiving said virtual avionics signal, said observation signal, and an image signal generated by an image generator wherein said mixer system mixes said virtual avionics signal into said first color key of said observation signal and mixes said image signal into said second color key of said observation signal so as to generate a virtual reality signal; and means for displaying said simulator display.

2. The video image tracking system according to claim 1, wherein said display means further comprises:

a virtual reality projector for receiving said virtual reality signal and generating a virtual reality image; and a virtual reality screen for receiving and displaying said virtual reality image.

3. The video image tracking system according to claim 1, wherein said visibly detectable track color is equivalent to a predetermined range of colors.

4. A video image tracking system for determining the positional location of an operator, comprising:

at least one camera carried by an operator;

a simulator display observed by said camera, said simulator display having a track color that is visibly detectable and distinguishable from all other colors in the visible spectrum and an instrument panel which has disposed thereon a first color key and a second color key observed by said camera;

a locating system in communication with said camera, wherein said locating system determines the positional location of the operator in relation to said track color, said locating system comprising a visual tracker for receiving a camera signal generated by said camera, wherein said visual tracker demodulates said camera signal into a lightness signal, a hue signal and a saturation signal for determining the location of said track color and generates a locator signal;

an environment system for receiving said locator signal so as to determine the orientation of a plurality of virtual avionics in relation to said track color and for generating a virtual avionics signal; and a mixer system for receiving said virtual avionics signal, said camera signal and an image signal generated by an image generator wherein said mixer system mixes said virtual avionics signal into said first color key of said camera signal and mixes said image signal into said second color key of said camera signal so as to generate a virtual reality signal; and a helmet mounted display system in communication with said locating system for displaying said simulator display.

5. The video image tracking system according to claim 4, wherein said helmet mounted display system further comprises:

a virtual reality projector for receiving said virtual reality signal and generating a virtual reality image; and a virtual reality screen for receiving and displaying said virtual reality image.

6. The video image tracking system according to claim 4 wherein said track color is equivalent to a predetermined range of values for said lightness signal, a predetermined range of values for said hue signal, and for a predetermined range of values for said saturation signal and wherein said visual tracker comprises a demodulator for demodulating said camera signal and rotating one of said lightness, hue and saturation signals to align all the colors observed by said camera on to one of an appropriate hue, lightness and saturation axis in a color spectrum, a comparator for determining if said lightness, hue and saturation signals are within predetermined ranges associated with said track color, a frame buffer for storing locations of said lightness, hue and saturation signals associated with said track color, and a central processing unit which performs a search algorithm to determine the exact location of said track color with respect to the operator's line of sight and generates said locator signal.

7. The video image tracking system according to claim 6 wherein said track color is distinguishable from said first color key, said second color key and all other colors within said simulator display.

8. A virtual environment deployable simulator, comprising:

an observation device carried by an operator and generating a signal;

a simulator display watched by said observation device, said simulator display having a plurality of independent color keys;

means for tracking said observation device in relation to said simulator display, said tracking means generating a locator signal wherein said tracking means comprises a track color within the visible spectrum positioned on said simulator display and distinguishable from all colors on said simulator display;

a demodulator for demodulating said signal into respective lightness, hue and saturation signals;

a comparator which determines whether said lightness, hue and saturation signals are associated with said track color and generating respective lightness, hue and saturation bi-level signals which indicate where said track color is within said signal;

a frame buffer for storing said bi-level signals; and a central processing unit (CPU) which communicates with said frame buffer to determine the exact location of said track color and generate said locator signal, said CPU superimposing a matrix of search dots, which represents the viewing position of said observation device with respect to said simulator display, on said signal representing said simulator display, wherein said CPU statistically determines the position of said track color with respect to those search dots in proximity to said track color;

an environment system for receiving said locator signal and incorporating virtual effects into said plurality of color keys; and means for displaying said virtual effects within said simulator display.

9. The virtual environment deployable simulator according to claim 8 wherein said environmental system further comprises:

a virtual avionics system for receiving an operator position derived from said locator signal and combining therewith a plurality of virtual avionics so as to generate a virtual avionics signal; and a mixer for incorporating said virtual avionics signal into one of said plurality of color keys so as to generate a virtual reality signal which is received by said display means.

10. The virtual environment deployable simulator according to claim 9 wherein said mixer also receives an image signal generated by an image generator wherein said mixer incorporates said image signal into another of said plurality of color keys for inclusion with said virtual reality signal.

11. The virtual environment deployable simulator according to claim 12 wherein said image signal and said virtual avionics signal are oriented with respect to said locator signal so that said virtual reality signal corresponds to the position of the operator within said display means.

12. The virtual environment deployable simulator according to claim 11 wherein said simulator display comprises:

an instrument panel having actual avionic instruments, a first color key, and a second color key, wherein said virtual avionics are superimposed on said first color key and wherein said image signal is superimposed on said second color key.

13. The virtual environment deployable simulator according to claim 12 wherein said virtual avionics signal includes a virtual avionics background signal with a virtual avionics animation signal.

* * * * *